(12) United States Patent
Harker et al.

(10) Patent No.: US 7,066,096 B1
(45) Date of Patent: Jun. 27, 2006

(54) TOW VEHICLE-DRAWN WASH SYSTEM AND GAME BUTCHERING STATION

(76) Inventors: Kevin K. Harker, 3105 County Line Rd., Mountain Grove, MO (US) 65711; Kevin R Smith, P.O. Box 344, Mountain Grove, MO (US) 65711

( * ) Notice: Subject to any disclaimer, the term of this patent is extended or adjusted under 35 U.S.C. 154(b) by 369 days.

(21) Appl. No.: 10/410,652

(22) Filed: Apr. 8, 2003

Related U.S. Application Data

(60) Provisional application No. 60/371,187, filed on Apr. 9, 2002.

(51) Int. Cl.
*A47B 23/00* (2006.01)

(52) U.S. Cl. ...................................... 108/44; 108/50.18
(58) Field of Classification Search ................. 108/44, 108/50.11, 50.13, 50.18; 239/172; 296/22, 296/156; 280/656; 224/519, 520, 488; 126/276, 126/25 R
See application file for complete search history.

(56) References Cited

U.S. PATENT DOCUMENTS

| | | | | |
|---|---|---|---|---|
| 1,513,357 A | * | 10/1924 | Webber | ...................... 126/276 |
| 2,183,066 A | | 12/1939 | Fields | |
| 2,784,999 A | * | 3/1957 | Hunt | ........................... 296/22 |
| 3,147,923 A | | 9/1964 | Smalley | |
| 3,696,803 A | * | 10/1972 | Holloway, Jr. | ............... 126/276 |
| 3,773,059 A | | 11/1973 | Arneson | |
| 4,454,628 A | | 6/1984 | Olson | |
| 5,031,602 A | * | 7/1991 | Vick | ......................... 126/25 R |
| 5,106,002 A | | 4/1992 | Smith et al. | |
| 5,284,300 A | | 2/1994 | Gries et al. | |
| 5,611,487 A | | 3/1997 | Hood | |
| 5,695,121 A | * | 12/1997 | Stillions et al. | ............. 239/172 |
| 5,833,295 A | * | 11/1998 | Farlow, Jr. | .................... 296/22 |
| 5,950,617 A | * | 9/1999 | Lorenz | ........................ 126/276 |
| 6,082,631 A | * | 7/2000 | Aslakson | ..................... 239/172 |
| 6,089,431 A | | 7/2000 | Heyworth | |
| 6,189,458 B1 | | 2/2001 | Rivera | |
| 6,234,408 B1 | * | 5/2001 | Stevens et al. | ............. 239/172 |
| 6,234,409 B1 | | 5/2001 | Aslakon | |
| D445,395 S | | 7/2001 | Okerlund et al. | |
| 6,254,473 B1 | | 7/2001 | Shore et al. | |
| 6,314,891 B1 | | 11/2001 | Larson | |
| 6,336,413 B1 | | 1/2002 | Ball | |
| 6,349,715 B1 | * | 2/2002 | McBroom | .................... 126/276 |
| 6,416,101 B1 | * | 7/2002 | Bartch | ......................... 296/22 |
| 2002/0043259 A1 | | 4/2002 | Brennan | |
| 2003/0096569 A1 | | 5/2003 | Britton | |

* cited by examiner

*Primary Examiner*—José V. Chen
(74) *Attorney, Agent, or Firm*—Jonathan A. Bay

(57) ABSTRACT

A tow vehicle-drawn wash system and game butchering station comprises a re-fillable storage tank, a hand-pump for pressurizing the tank, a wash hose connected for discharging the tank in a wash stream, and optionally a game-butchering table attached to the tank. There are furthermore included provisions for mounting the tank to either a tongue of a trailer or else a draw bar.

30 Claims, 6 Drawing Sheets

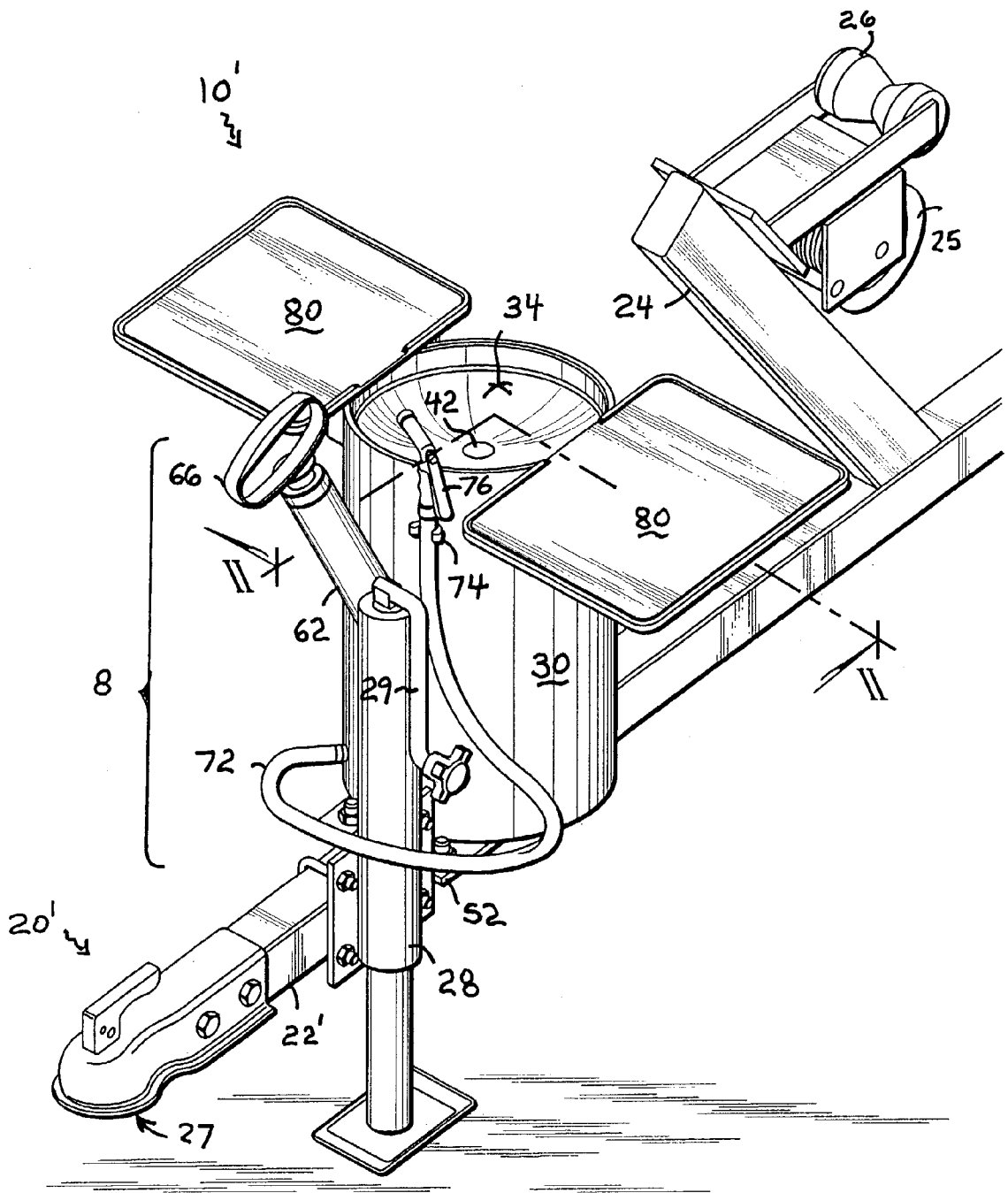

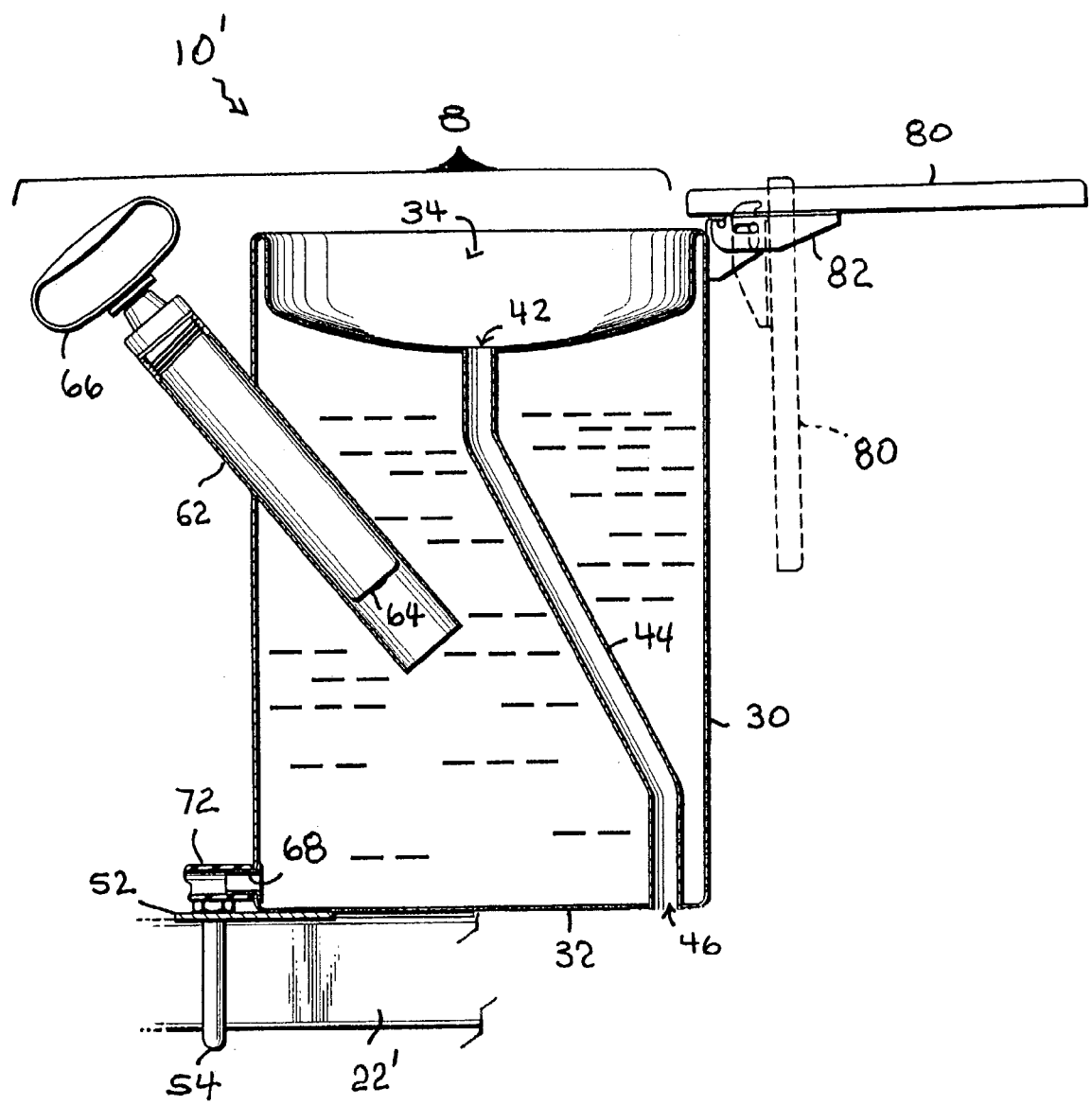

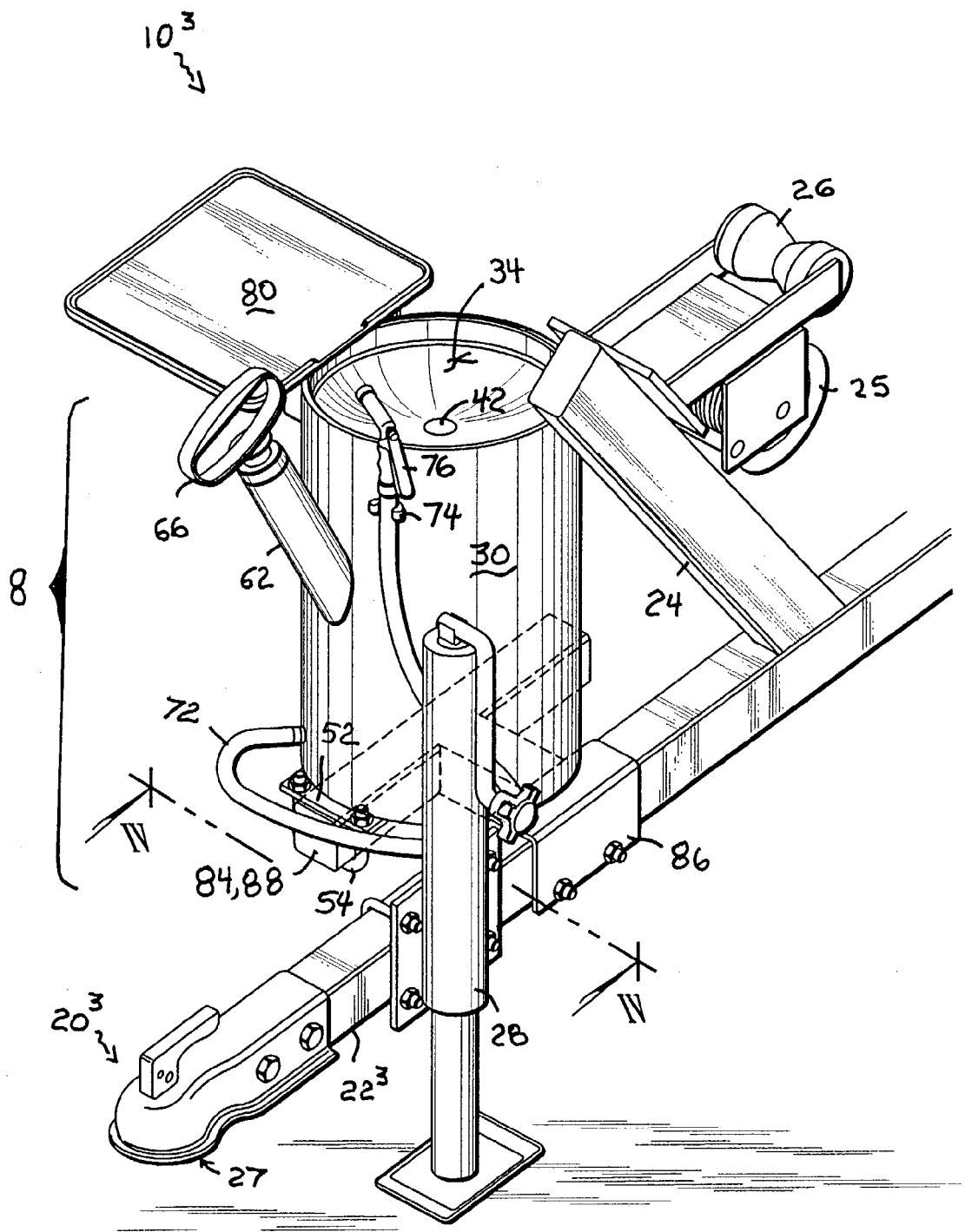

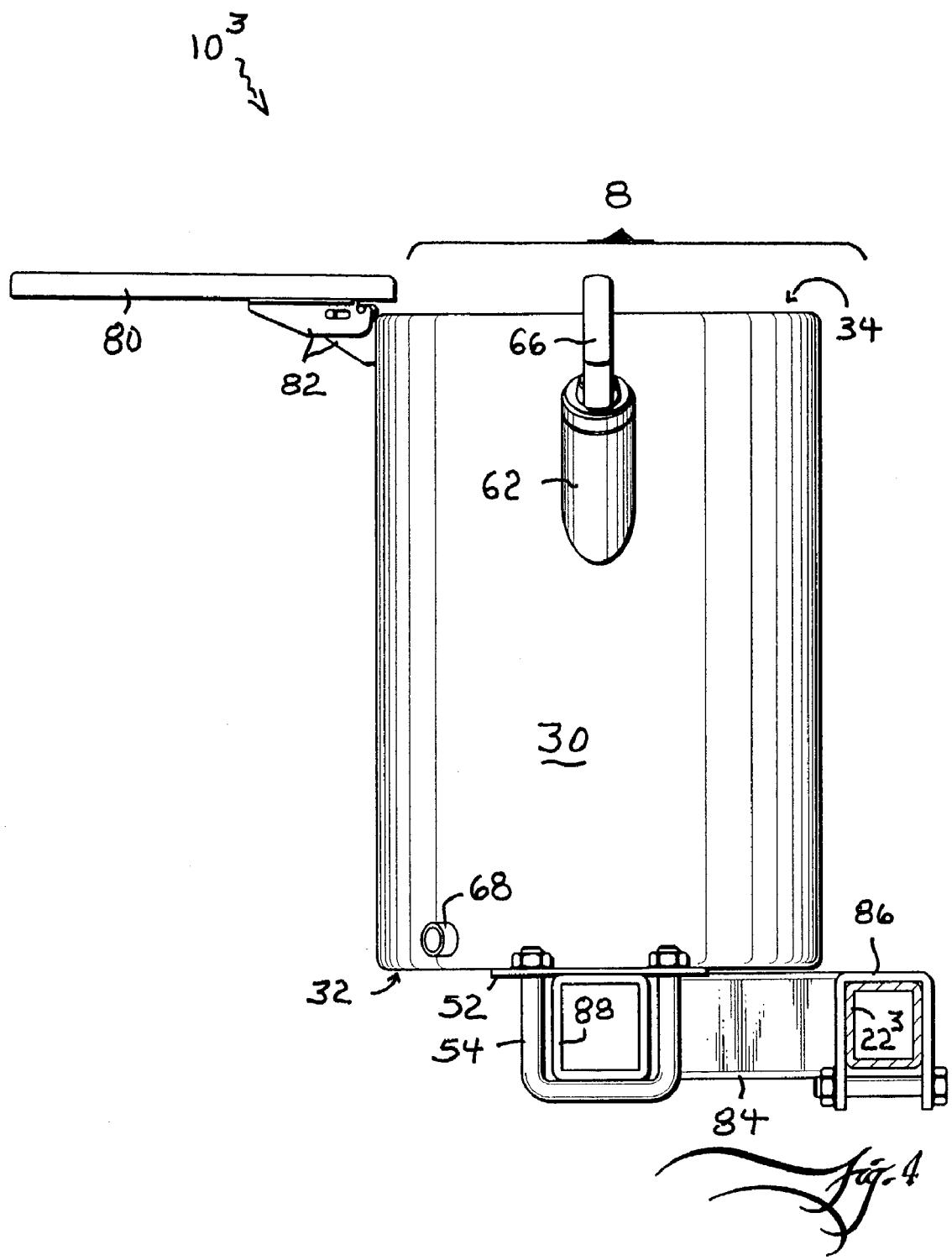

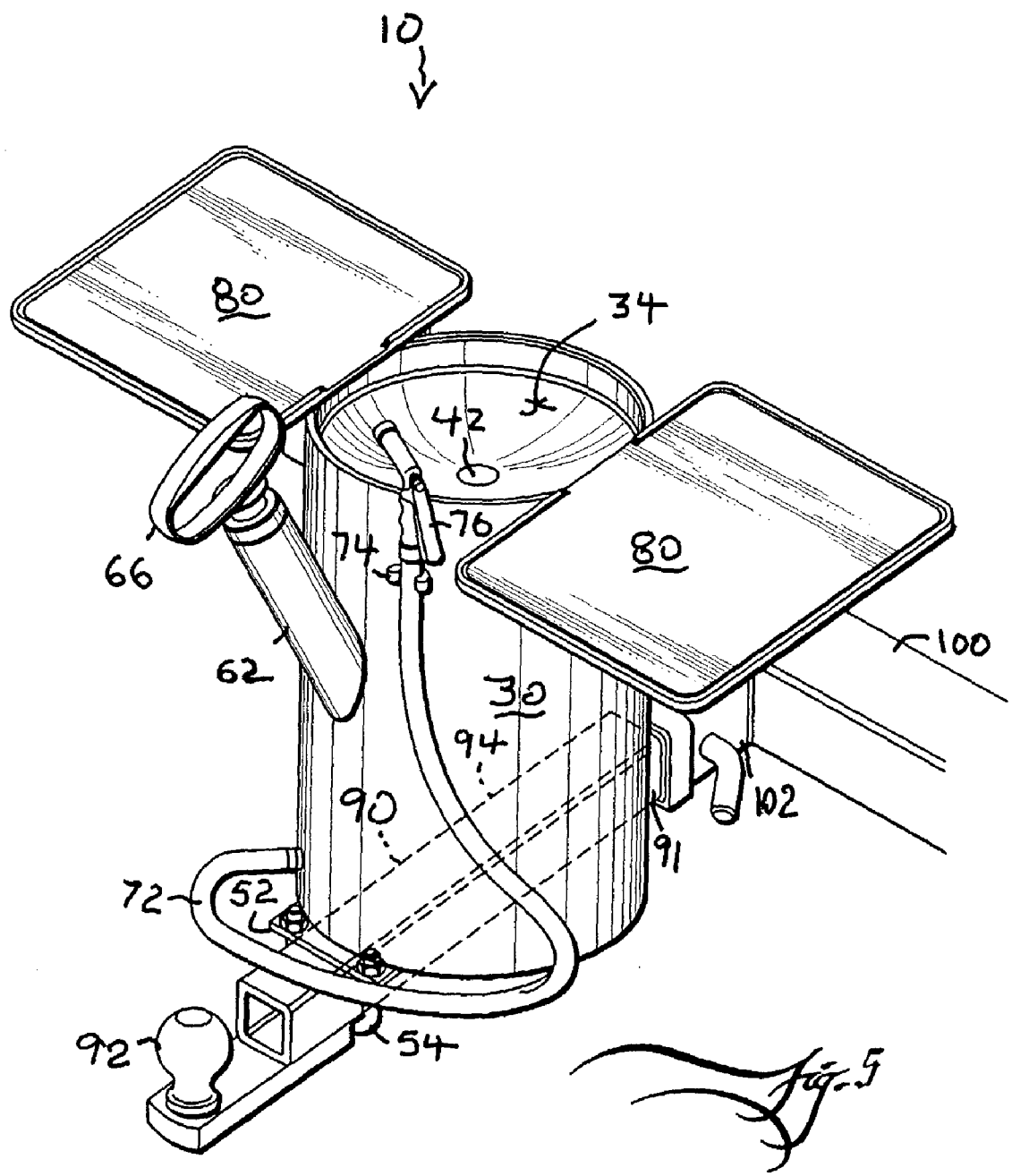

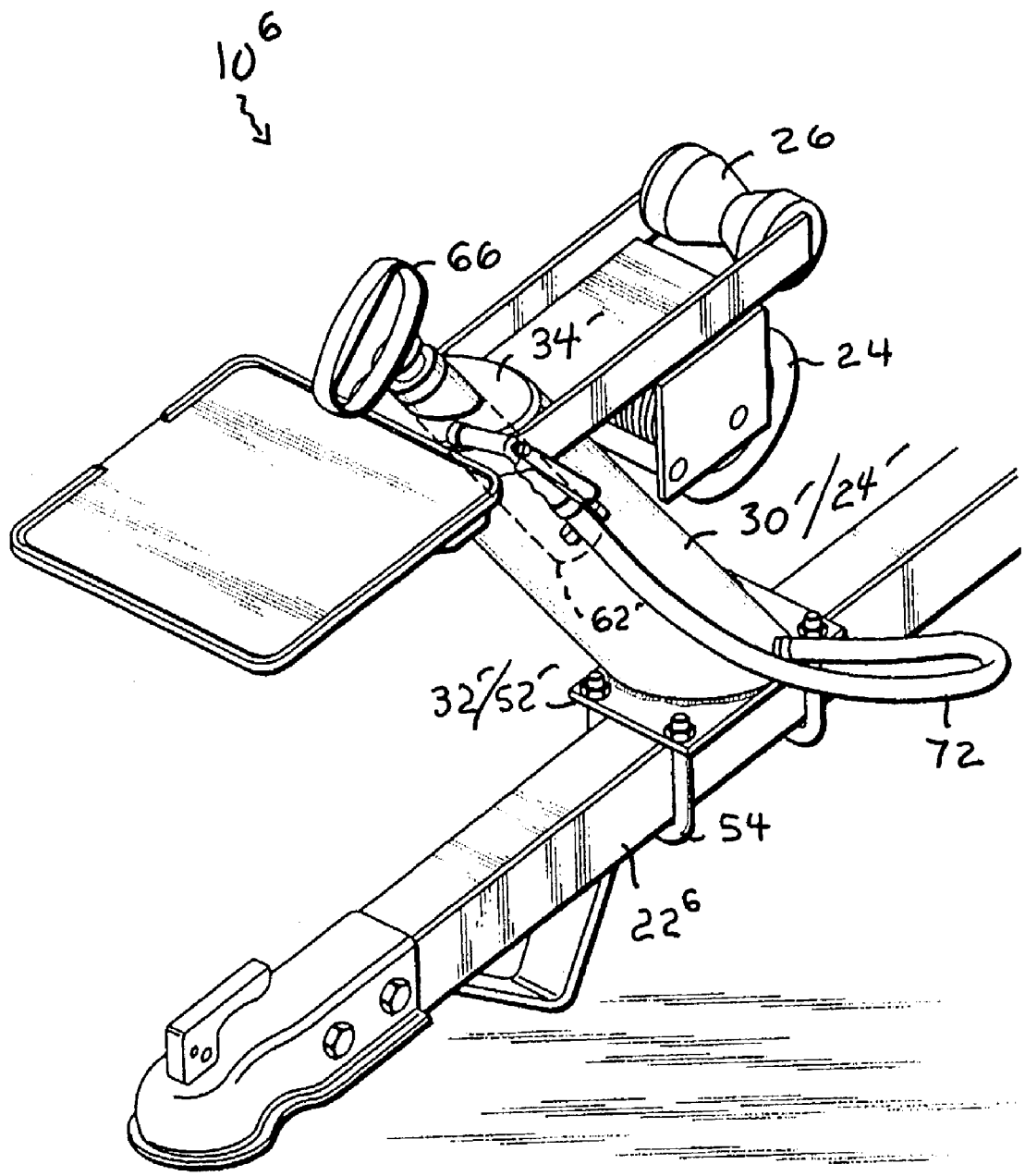

TOW VEHICLE-DRAWN WASH SYSTEM AND GAME BUTCHERING STATION

CROSS-REFERENCE TO PROVISIONAL APPLICATION(S)

This application claims the benefit of U.S. Provisional Application No. 60/371,187, filed Apr. 9, 2002, which provisional application is incorporated herein in full by this reference.

BACKGROUND AND SUMMARY OF THE INVENTION

The invention relates to accessories or implements for land vehicles and, more particularly, to a wash system that is drawn behind a tow vehicle or, in the alternative, a wash system and game butchering station that is drawn behind a tow vehicle. Preferably the drawn behind a tow vehicle aspects of the invention are accomplished either by being mounted on a trailer that in turn is hitched to the tow vehicle, or else hitched directly to the tow vehicle irrespective of any trailer. A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings, FIG. 1 is a perspective view of a tow vehicle-drawn wash system and game butchering station in accordance with the invention, as provisioned to mount on a long-tongue trailer;

FIG. 2 is a sectional view taken along L-shaped line 11—11 in FIG. 1;

FIG. 3 is a perspective view of an alternate version of the tow vehicle-drawn wash system and game butchering station in accordance with the invention except adapted to mount on a short-tongue trailer;

FIG. 4 is an elevational view, partly in section, taken in the direction of the arrows applied to offset line IV—IV in FIG. 3;

FIG. 5 is a perspective view of a version of the tow vehicle-drawn wash system and game butchering station that is fairly comparable to FIG. 1 except adapted to mount on an extended draw bar in accordance with the invention; and FIG. 6 is a perspective view of another version of the tow vehicle-drawn wash system and game butchering station in accordance with the invention except adapted to double as a winch tower on the undergirding trailer tongue.

DETAILED DESCRIPTION OF THE PREFERRED EMBODIMENTS

FIGS. 1 and 2 show a tow vehicle-drawn wash system 8 and/or wash system and game butchering station $10^1$ in accordance with the invention. The version of the invention shown in FIGS. 1 and 2 is adapted to mount on a long-tongue trailer $20^1$. This particular trailer $20^1$ is, for no special reason other than to provide a representative example of a long-tongue trailer, is more particularly a boat trailer, as evident by the winch tower 24 having winch 25 and bow bumper 26 hardware. The boat (not illustrated) may be suitable for purposes of, including without limitation, fishing or hunting such as for a non-limiting example, duck hunting.

The wash system 8 aspects of the invention center around a tank 30 or reservoir. To date it is preferred to construct the tank 30 from metal materials because of durability and ease of non-mass production, including welding or fastening parts and accessories thereon. For example, the tank 30 can be produced from aluminum. The tank 30 has a cylindrical sidewall, a bottom end 32 formed as basic or simplistic as practical, and a top end 34 formed advantageously as follows. That is, the top end 34 is recessed or dished downwardly to define a basin. The basin 34 is provided for any reason a user would want. The basin-shaped top end 34 is serviced by a central drain 42 that empties through a drain tube 44 empties through an exhaust hole 46 below the tank 30 (as well as clear of the trailer tongue $22^1$). The drain tube 44 is disposed inside the tank 30 and is also preferably the same material as the top and bottom 34 and 32 (eg., aluminum in this example) to allow welding thereto. That way, the tank 30 can be sealed off to allow pressurization.

The tank 30, in its mounted position, is stood on its bottom end 32. The bottom end 32 is mated to a sub-base 52 that provides leading and trailing tab extensions (only leading tab extension 52 is illustrated in the views, it being better shown in FIG. 2). Each of the tab extensions 52 are provided with a pair of holes for accommodating U-bolts 54 (as between FIGS. 1 and 2 shown better in FIG. 2, but better still in FIG. 4).

Hence the tank 30 is mated on top of a long-version tongue $22^1$ of a trailer $20^1$ by the U-bolt 54 connection as shown.

However, the invention is not intended to be limited to the method of construction or connection specifically mentioned, as persons having ordinary skill in the art would readily understand how to accomplish the same through routine other variations.

FIGS. 1 and 2 show the tank 30 as a separate entity from the winch tower 24, although FIG. 6 shows that version of the tank 30' doing double duty as the winch tower as well, as will be more particularly described below. In FIGS. 1 and 2, however, the tank 30 is indeed mounted on this trailer $20^1$'s tongue, ahead of the winch tower 24, as shown.

The tank 30 further includes a pump tube 62 for accepting a pump assembly 64, a nipple 68 near the tank 30's bottom for attachment of a hose 72, and an optional sealable vent high up on the sidewall (or on the top end) for re-filling purposes. The vent is not shown explicitly in the drawings but is plugged by a winged-headed screw or plug 74 whose winged head doubles as a hose gripper. The hose 72 extends between a head end and a tail end. The head end of the hose 72 can be removably secured to the nipple 68 by any of various known means, including without limitation a hose clamp (not shown). The tail end of the hose 72 is coupled to a nozzle 76, which in the drawings for convenience of illustration is shown as a pistol-grip sprayer. The sprayer 76 optionally provides some measure of throttle control over the discharge stream as well as preferably provides some capability to focus the discharge stream from extremes between a jet and a mist.

Referring to FIG. 2, the pump tube 62 is welded to the tank 30's sidewall and provides an outside upper end formed with internal thread. The pump unit 64 removably screws into the pump tube 62 by having a collar with mating threads for this purpose. To re-fill the tank 30, a user unscrews the removable pump unit 64 and pours water in through the pump tube 62 as by sticking in the end of a garden hose supplied by a faucet (eg., spigot) or the like (none of this is shown). The wing-headed plug 74 is untwisted slightly to crack the seal it forms and that way allow trapped air to escape while the tank 30 fills. As soon as the tank 30 is filled, the wing-headed plug 74 can be twisted tight in order to seal the tank 30 for pressurizing purposes.

It is an aspect of the invention that the tank 30 is pressurized by hand by the pump unit 64, which is a hand pumped device. This is better shown in FIG. 2. The removable pump unit 64 has a D-shaped handle 66 that the user grasps to operate the manually-pumped unit 64. That is, the user operates the handle 66 in retraction and plunging strokes to drive the plunger (not in view) and hence force the internal air pressure to build. FIG. 2 shows the handle 66 at the extreme end position of a plunging stroke. If the plug 74 is twisted tight and the spray nozzle 76 is OFF, the tank 30's pressure will rise and hold. The preferred use pressure is about thirty-five psig (~2.4 atm. gauge pressure). In use, the user sprays with the wash system 8 as perhaps starting at a pressure of thirty-five psig. If the pressure fizzles but there is still water in the tank 30, then the user pauses from spraying and re-pumps up the pressure to a desired level of re-pressurization. Following that, the user can return to continue to spray away.

Staying in FIG. 2, the hose nipple 68 is near the bottom of the tank 30. That way, pressurized water will be forced out the hose 72 when the nozzle 76 is ON until the water level falls to nearly the bottom of the tank 30. Hence there is more complete utilization of the tank 30's capacity by locating the hose nipple 68 at the bottom. Also, the bottom-placement of the hose nipple 68 facilitates rinsing out the tank 30 for maintaining its cleanliness, but preferably the tank 30 is reserved for clean water. Rinsing out the tank 30 should be an infrequent chore. The preferred tank capacity includes without limitation about five gallons (~20 liters).

Except during tank rinsing, the head end of the hose 72 remains normally coupled to the tank 30's hose-nipple 68. For game butchering purposes, the hose 72 needs only an abbreviated length of about a yard or two (~1 or 2 m). The tail (or free) end of the hose 72 is optionally connected to any assortment of nozzle devices (eg., 76). FIG. 1 shows the hose 72 connected into a pistol-grip type spray nozzle (ie., 76).

The wash system 8 in isolation provides various advantages. The wash system 8 is mountable for travel behind a tow vehicle such as one that might be towing a trailer loaded with a boat or else ATV's and dirt bikes and the like.

Before departure (from home or else a gas station while in transit), a user has the option of filling the tank 30 with water by convenience of any available garden hose connected to a supply spigot (ie., faucet) or the like (none of this is shown). The user optionally fills the tank 30 but leaves it de-pressurized for travel. The user then reaches his or her destination. Presumably the destination might be a relatively primitive back-country boat launch or dirt bike/ATV trailhead. At any given time, whenever a user desires to wash him or herself off—or else and without limitation the dirt bike, the ATV, the boat and so on—the user has at his or her disposal a wash system 8 in accordance with the invention as mounted behind the tow vehicle for this purpose. The advantage of the wash system 8 is that it includes a hand pump 64 for pressurizing the tank 30. That way, the user can jet spray the target object (ie., him or herself of some other target object) to rinse away grime. Trials have found that a full tank 30 requires several pauses during spray use to re-charge the pressure.

In the drawings the given length of hose 72 is relatively short, it being only a yard or two (eg., ~1 or 2 m). However the invention is not intended to be limited to the variations specifically mentioned as about any suitable length of hose 72 will satisfy the purpose and longer lengths may be more desirable for other applications. For instance, in cases of washing down a boat, the hose 72 would preferably be several times longer to wash off the boat to the extent practicable. Saltwater launching aside, even in freshwater there is a need for rinsing boats after use. In some cases the users will have muddy feet or the like from repetitive instances of jumping in and out of the boat onto a muddy shore or the like, as is common in certain conditions with duck and geese hunters. In other cases, the waterways in much of mid-America contain "hard" water, meaning that there is a lot dissolved mineral matter. When hard water dries, a scaly or lime/rust crust (eg., $CaCO_3$ and so on) is left behind, the removal afterwards of which will require a vinegar or weak acid wash. If however a user has a supply of fresher or "soft" water, then the user can simply wash down the boat at the time of take-out and eliminate much of the lime/rust problem.

FIGS. 1, 3, 5 and 6 show the wash system 8's hose 72 connected in a non-use position as for travel and the like. Preferably the wing-headed plug 74 grips the hose 72 tightly as shown for convenience of storing the hose 72 in a position where it is secured for travel and conveniently in reach of users working at the butchering table(s) 80.

Referring now to the drawings for discussion of the game butchering station, the invention includes one or more optional game butchering tables 80 (or shelves). Example game butchering operations might include without limitation fish or waterfowl cleaning such as duck and goose cleaning. Alternatively, in cases where the trailer is adapted for transporting ATV's, the butchering station affords opportunities for the upland game hunter. However the invention is not intended to be limited to the examples specifically mentioned.

FIG. 2 shows one table top 80 as representative of the other. The table top 80 is mounted to the water tank 30 by a bracket and hinge combination 82. FIG. 2 shows a solid-line rendition of the table top 80 in an UP position as well as a dashed-line rendition of the table top 80 in a retracted or DOWN position. The DOWN position might be required to give a user clearance to operate the winch 25 on the winch tower 24, the crank 29 on the jack 28 (see FIG. 1) or the hand pump 64. Indeed, the DOWN position for the table(s) 80 is preferred for travel. The DOWN table top 80 is sufficiently thin as to knife relatively cleanly through the air during travel. That way, the table 80 will neither flap nor torque on the brackets 82. The brackets 82 will be freer of damage as a result.

In FIG. 1 the table tops 80 are deployed in their UP positions for various purposes. The table tops 80 are advantageous for fish cleaning operations. The table tops 80 provide a chest-high work surface for standing users. One user might be filleting fish on one table 80, a companion user might be skinning fillets on the other table 80, and the basin 34 provides a vessel for rinsing and storing the skinned fillets. For this purpose preferably the drain hole 42 is corked by a stopper or the like (not shown). The spray aspects of the wash system 8 allow the users to readily clean their hands, fillets, knives, indeed the very table tops 80 on which they work. With what water is leftover, the user(s) can wash off their boots or the boat or bumpers or anything else.

FIGS. 3 and 4 show an alternate version of the tow vehicle-drawn wash system and game butchering station $10^3$ in accordance with the invention except adapted to mount on a short-tongue trailer $20^3$. In the matter of a short-tongue trailer $20^3$, space is at a premium between the winch tower 24 and hitch end 27 (and jack 28 if any). It is simply too crowded to mount the tank 30 on directly on the tongue $22^3$ as shown in FIGS. 3 and 4. Hence FIGS. 3 and 4 show the provision of an H-shaped carriage 84 in accordance with the intention. The H-shaped carriage 84 has one leg 86 produced as an inverted channel section for enveloping and bolting tightly to the trailer tongue $22^3$ as shown. The other leg 88 is a square tube to which the tank 30's leading and trailing tabs 52 are secured to by U-bolts 54. If space doesn't permit use of dual table tops 80, then one is removed on the inboard side of the tank 30 to leave just a single table top 82 as shown. The uses and advantages of the FIGS. 3 and 4 version of the invention $10^3$ are otherwise comparably the same as the FIGS. 1 and 2 version.

FIG. 5 shows a version of the tow vehicle-drawn wash system and game butchering station 10 that is fairly comparable to FIG. 1 except adapted to mount on an extended draw bar 90 in accordance with the invention. The extended draw bar 90 extends between a hitch end 91 and a ball end 92. The hitch end 91 removably inserts and pins into the opening of a hitch box 102 of receiver 100. The receiver 100 needless to say is (more or less) permanently mounted to the back end of the tow vehicle (not shown), wherein there is a given presumption that most users of the invention shall be driving about any sort of car or truck or utility vehicle. The extended draw bar 90 provides a span of square tube 94 sufficient for permanently attaching the inventive wash system and game butchering station 10 by the sub-base tabs 52 thereof, by means of U-bolts 54 as previously described. In use, the ball 92 allows a trailer (this is not shown) to hitch up optionally as often as and for as long as desired. At other times when the trailer is unhitched, the wash system and game butchering station 10 combined with the extended draw bar 90 as shown by FIG. 5 can remain hitched to the tow vehicle, as this provides advantages for work and recreation in general, examples including without limitation construction and camping.

FIG. 6 shows another embodiment of the tow vehicle-drawn wash system and game butchering station 106 in accordance with the invention. Here the tank 30' is adapted to double as a winch tower on the undergirding trailer tongue $22^6$. It is preferred if tank 30' is produced from steel pipe for additional strength. The pipe's ends can be cut at the angles as shown, the bottom being constructed as rectangular plate 32'/52' providing tab extensions for U-bolt connection to the trailer tongue $22^6$. The top end 34' of the pipe 30' can be formed from an oval shape that is cut out of plate stock. The pump tube 62' is sunk into the tank 30' directly through the top end 34', obviating the need during re-fill for a vent for trapped air. This is because trapped air can escape all it needs to through the pipe tube 62' when the pump unit 64 is removed. In this version of the invention, the tank 30' only includes a single retractable table top 80, and no dished basin. It is an aspect of the invention that the winch hardware such as the boat winch 25 and bow bumper 26 are mounted directly to the tank 30' as shown.

Hence the inventive tank 30' performs two jobs concurrently, one as a storage tank and the other as a winch tower 24'.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A tow vehicle-drawn wash system and multi-purpose foodstuff preparation station comprising:
   a wash-fluid storage tank formed with an outlet for discharging said tank and adapted for supplying wash fluid to wash-fluid emission apparatus;
   a source for pressurizing the tank;
   provisions for mounting the tank to either a tongue of a trailer or else a draw bar; and
   a wash basin recessed into a top end of the tank.

2. The tow vehicle-drawn wash system and multi-purpose foodstuff preparation station of claim 1 further comprising a multi-purpose foodstuff preparation shelf attached by a mechanical link to either the tank or the provisions provided for mounting the tank.

3. The tow vehicle-drawn wash system and multi-purpose foodstuff preparation station of claim 2 wherein the mechanical link includes an operative mechanism such that the shelf by virtue of the operative mechanism is deployable between use and non-use positions whereby the use position affords multi-purpose foodstuff preparation opportunities while the non-use position is preferred for travel.

4. The tow vehicle-drawn wash system and multi-purpose foodstuff preparation station of claim 3 wherein the mechanical link comprises a bracket and hinge combination such that the non-use position is a swung-down position and the use-position is swung-out position.

5. The tow vehicle-drawn wash system and multi-purpose foodstuff preparation station of claim 1 further comprising a wash hose connected in fluid communication with the outlet for discharging the tank in a wash stream.

6. The tow vehicle-drawn wash system and multi-purpose foodstuff preparation station of claim 5 wherein the wash hose terminates in a nozzle for selectively operating between ON and OFF extremes, the OFF extreme capable of preserving pressure in the tank.

7. The tow vehicle-drawn wash system and multi-purpose foodstuff preparation station of claim 1 wherein the provisions for mounting the tank comprise weldments, fastening hardware, or both for mounting the tank to the tongue of a trailer.

8. The tow vehicle-drawn wash system and multi-purpose foodstuff preparation station of claim 1 wherein the provisions for mounting the tank comprise weldments, fastening hardware, or both for mounting the tank laterally outboard from the tongue of a boat trailer in order to give clearance to operation of a boat winch on a winch tower.

9. The tow vehicle-drawn wash system and multi-purpose foodstuff preparation station of claim 1 wherein said source comprises a handpump.

10. A tow vehicle-drawn wash station comprising:
    a wash-fluid storage tank;
    a source for pressurizing the tank;
    a wash hose connected in fluid communication with the tank for discharging the tank in a wash stream;
    provisions for mounting the tank to either a tongue of a trailer or else a draw bar; and
    a wash basin recessed into a top end of the tank.

11. The tow vehicle-drawn wash station of claim 10 wherein the wash hose terminates in a nozzle for selectively operating between ON and OFF extremes, the OFF extreme capable of preserving pressure in the tank.

12. The tow vehicle-drawn wash station of claim 10 wherein the provisions for mounting the tank comprise weldments, fastening hardware, or both for mounting the tank to the tongue of a trailer.

13. The tow vehicle-drawn wash station of claim 10 wherein the provisions for mounting the tank comprise weldments, fastening hardware, or both for mounting the tank laterally outboard from the tongue of a boat trailer in order to give clearance to operation of a boat winch on a winch tower.

14. The tow vehicle-drawn wash station of claim 10 wherein said source comprises a handpump.

15. A tow vehicle-drawn wash system and multi-purpose foodstuff preparation station comprising:
   a wash-fluid storage tank;
   a source for pressurizing the tank;
   a wash hose connected in fluid communication with the tank for discharging the tank in a wash stream;
   provisions for mounting the tank to either a tongue of a trailer or else a draw bar; and
   a multi-purpose foodstuff preparation shelf attached by an operative mechanism to either the tank or the provisions provided for mounting the tank; wherein the shelf is deployable by virtue of the operative mechanism between use and non-use positions whereby the use position affords multi-purpose foodstuff preparation opportunities while the non-use position is preferred for travel.

16. The tow vehicle-drawn wash system and multi-purpose foodstuff preparation station of claim 15 further including a wash basin.

17. The tow vehicle-drawn wash system and multi-purpose foodstuff preparation station of claim 15 wherein the wash basin is recessed into a top end of the tank.

18. The tow vehicle-drawn wash system and multi-purpose foodstuff preparation station of claim 15 wherein the wash hose terminates in a nozzle for selectively operating between ON and OFF extremes, the OFF extreme capable of preserving pressure in the tank.

19. The tow vehicle-drawn wash system and multi-purpose foodstuff preparation station of claim 15 wherein the provisions for mounting the tank comprise weldments, fastening hardware, or both for mounting the tank to the tongue of a trailer.

20. The tow vehicle-drawn wash system and multi-purpose foodstuff preparation station of claim 15 wherein the provisions for mounting the tank comprise weldments, fastening hardware, or both for mounting the tank laterally outboard from the tongue of a boat trailer in order to give clearance to operation of a boat winch on a winch tower.

21. The tow vehicle-drawn wash system and multi-purpose foodstuff preparation station of claim 15 wherein said source comprises a handpump.

22. The tow vehicle-drawn wash system and multi-purpose foodstuff preparation station of claim 15 wherein the operative mechanism comprises a bracket and hinge combination such that the non-use position is a swung-down position and the use-position is swung-out position.

23. A tow vehicle-drawn wash system and multi-purpose foodstuff preparation station comprising:
   a wash-fluid storage tank formed with an outlet for discharging said tank and adapted for supplying wash fluid to wash-fluid emission apparatus;
   a source for pressurizing the tank;
   provisions for mounting the tank to either a tongue of a trailer or else a draw bar; and
   a multi-purpose foodstuff preparation shelf attached by an operative mechanism to either the tank or the provisions provided for mounting the tank; wherein the shelf is deployable by virtue of the operative mechanism between use and non-use positions whereby the use position affords multi-purpose foodstuff preparation opportunities while the non-use position is preferred for travel.

24. The tow vehicle-drawn wash system and multi-purpose foodstuff preparation station of claim 23 further comprising a wash basin recessed into a top end of the tank.

25. The tow vehicle-drawn wash system and multi-purpose foodstuff preparation station of claim 23 wherein the operative mechanism comprises a bracket and hinge combination such that the non-use position is a swung-down position and the use-position is swung-out position.

26. The tow vehicle-drawn wash system and multi-purpose foodstuff preparation station of claim 23 further comprising a wash hose connected in fluid communication with the outlet for discharging the tank in a wash stream.

27. The tow vehicle-drawn wash system and multi-purpose foodstuff preparation station of claim 23 wherein the wash hose terminates in a nozzle for selectively operating between ON and OFF extremes, the OFF extreme capable of preserving pressure in the tank.

28. The tow vehicle-drawn wash system and multi-purpose foodstuff preparation station of claim 23 wherein the provisions for mounting the tank comprise weldments, fastening hardware, or both for mounting the tank to the tongue of a trailer.

29. The tow vehicle-drawn wash system and multi-purpose foodstuff preparation station of claim 23 wherein the provisions for mounting the tank comprise weldments, fastening hardware, or both for mounting the tank laterally outboard from the tongue of a boat trailer in order to give clearance to operation of a boat winch on a winch tower.

30. The tow vehicle-drawn wash system and multi-purpose foodstuff preparation station of claim 23 wherein said source comprises a handpump.

* * * * *